United States Patent [19]

Natarajan

[11] Patent Number: 5,742,594
[45] Date of Patent: Apr. 21, 1998

[54] METHOD AND APPARATUS FOR ALLOCATING SHARED BANDWIDTH AMONG A PLURALITY OF USERS

[75] Inventor: Kadathur Subramanya Natarajan, Schaumburg, Ill.

[73] Assignee: Motorola, Inc., Schaumburg, Ill.

[21] Appl. No.: 662,592

[22] Filed: Jun. 13, 1996

[51] Int. Cl.$^6$ ..................................................... H04J 3/16
[52] U.S. Cl. ........................... 370/336; 370/348; 370/443; 370/468
[58] Field of Search ................................. 370/336, 345, 370/348, 437, 443, 444, 468

[56] References Cited

U.S. PATENT DOCUMENTS 5,570,355  10/1996  Dail et al. ............................. 370/461

OTHER PUBLICATIONS

Kai-Yeung Sin et al., "Adaptive Proportional Rate Control for ABR Service In ATM Networks," Conference Proceedings of the 1995 IEEE Fourteenth Annual Communications (Cat. No. 95CH35751), pp. 529–535, Mar. 1995.

Gianluca Cena et al., "Comparison of Adaptive Fairness Control Mechanisms for DQDB Metropolitan Area Networks," Conference Proceedings of the 1995 IEEE Fourteenth Annual Communications (Cat. No. 95ch35751), pp. 205–211, Mar. 1995.

*Primary Examiner*—Melvin Marcelo
*Attorney, Agent, or Firm*—Darleen J. Stockley

[57] ABSTRACT

Shared bandwidth is allocated among a plurality of users of a communications system of the type in which information is communicated in a sequentially repeating series of frames of information, each frame being subdivided into a number of slots, and each slot being capable of carrying a quantity of information. The bandwidth is allocated by determining the number of slots available in a frame for a predetermined group of users, determining the number of slots requested by each user of the group, and allocating slots in the frame to predetermined ones of the users of the group in accordance with a predetermined allocation scheme.

10 Claims, 2 Drawing Sheets

METHOD AND APPARATUS FOR ALLOCATING SHARED BANDWIDTH AMONG A PLURALITY OF USERS

FIELD OF THE INVENTION

The invention is directed generally to an improvement in a communications system, and more particularly to the allocation of available bandwidth in a communication link among a plurality of users.

BACKGROUND OF THE INVENTION

In an integrated services communication network, different types of communications services are provided to different types of users, which can be distinguished generally by their bandwidth and performance requirements. Broadly speaking, these users can be classified into two categories: (1) real time applications, and (2) non-real time applications. Real time applications require services that guarantee communication bandwidth on a periodic and recurring basis, and real time delivery of communications. Examples of such applications are digitized voice and video communications. In these types of communications, a message generated at a source station must be received at a destination station within a given amount of time. On the other hand, non-real time applications may not require guaranteed bandwidth, but require zero or near-zero error rates, and can tolerate non-real time delivery. Such non-real time applications may include, for example, interactive data transfer between work stations and servers, bulk file transfer, and the like.

Future wireless networks will be able to integrate voice, video and data services and enable users to communicate multimedia information. Such wireless networks will be expected to interface with and be compatible with fixed, wireline ATM/B-ISDN networks. An important system design issue is the selection of a suitable technique for sharing bandwidth among the various users in a manner that is compatible with the wireline ATM/B-ISDN network. In particular, the access control scheme used in the wireless segment should support the different users. An important consideration in this latter regard is providing a flexible and efficient method for allocating wireless bandwidth to such a heterogeneous group of users, in such a manner that users have reasonable access to the shared medium. Furthermore, the wireless extensions to such ATM/B-ISDN networks are desired to be seamless. Currently known techniques are either not compatible or are not seamless extensions of wireline ATM networks and services. Accordingly, there exists a need for a method of allocating available bandwidth among a plurality of users, which method is not constrained by the shortcomings of the prior art.

DETAILED DESCRIPTION OF A PREFERRED EMBODIMENT

While the invention may find other applications, the disclosure will be facilitated by specific reference to the problem of allocating wireless bandwidth to a mix of heterogeneous wireless users requiring various types and amounts of data rate service. Moreover, in the ensuing description, specific reference is made to use of the invention in connection with a wireless uplink for an asynchronous transfer mode broadband-integrated services digital network (ATM/B-ISDN). However, the invention is not so limited but may find utility in other applications.

Figure 1:
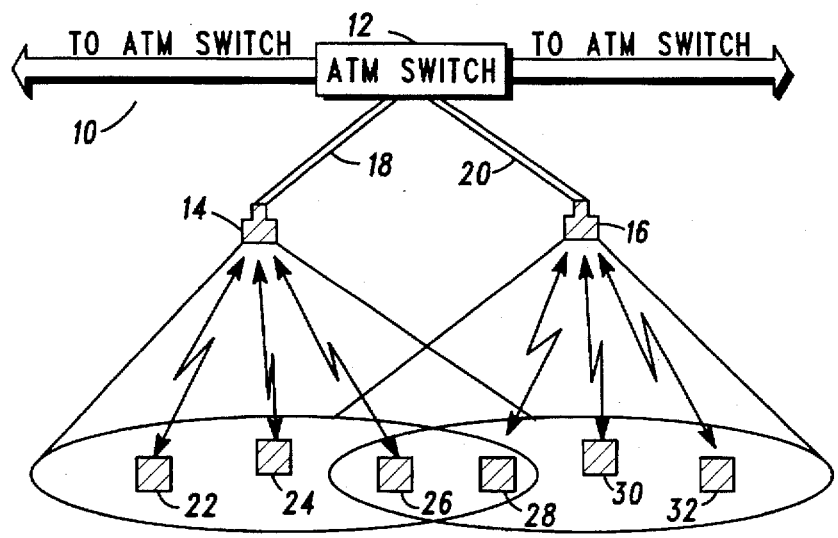
FIG. 1 is a functional diagram of an ATM network having a wireless uplink for accommodating a plurality of users.

Referring now to the drawings, and initially to FIG. 1, the invention will be described with reference to its use in connection with an asynchronous transfer mode (ATM) network 10. As diagrammatically illustrated in FIG. 1, the ATM network 10 includes an ATM switch 12, which is interconnected with a plurality of other similar ATM switches to form the network 10. Each ATM switch 12 may service a number of base stations 14, 16, which are each coupled with the ATM switch 12 by wireline communications links, or resources 18 and 20, respectively. Each base station may in turn service a plurality of wireless stations 22, 24, 26, and 28, 30, 32, using a wireless communications link interface, as is known in the art. In FIG. 1, a cellular network is illustrated, in which a single cell consists of one base station 14 and a plurality of wireless stations 22, 24, 26, etc. Each of the wireless stations 22, 24 etc. communicates with its associated base station 14 or 16, via wireless communications resources. As shown in FIG. 1, cellular coverage areas served by each of the base stations 14 and 16 may overlap somewhat (i.e., wireless stations 26, 28 can effectively communicate with either of two base stations 14, 16).

Today's ATM network architecture and protocols have been defined to facilitate multimedia communication in a wireline environment. Four distinct service classes have been defined for transport by ATM networks, as follows.

1) Constant bit rate (CBR) service provides a virtual fixed bandwidth transmission circuit between a source station and a destination station. This service is intended for real time voice and video communications, and requires fixed bandwidth, which can be used on a reserved basis.

2) Variable bit rate (VBR) service allows for applications that send data at higher burst rates, as long as the overall data rates do not exceed a specified average. VBR service includes both real time and non-real time service classes (VBR-RT and VBR-NRT). VBR-RT services are used for such applications as compressed video, while VBR-NRT services are used for "bursty" traffic such as transaction processing applications, for example, bank teller transactions, airline reservations, etc., as well as local area network (LAN) interconnections.

3) Unspecified bit rate (UBR) service applications send data across a network with no specific requirement as to when or if the data will arrive at a specific destination.

4) Available bit rate (ABR) service may make use of any available bandwidth, but intelligence built into the network helps guard against data loss by instructing sending stations to slow down or stop transmissions when the network is congested. ABR service will also provide minimum bandwidth guarantees.

Referring again to FIG. 1, an important consideration is that of sharing bandwidth among wireless station users—that fall into various ones of the above four service classes—in a way that is compatible with the wireline ATM/B-ISDN network. In the wireless stations 22, 24, etc. shown in FIG. 1, each station is associated with at least one base station 14, and may consist of one of the different service classes described above. For example, each wireless station may comprise traffic sources such as voice sources (transmitting in CBR mode), video sources (transmitting in either CBR or VBR-RT mode), or data sources (transmitting in VBR-NRT, ABR or UBR mode).

For purposes of description of the invention, there will be described hereinbelow only the inbound channel (wireless station to base station) and its shared usage by multiple wireless stations. Generally speaking, the communication with the base station is performed using a time division multiple access (TDMA) based system. In the outbound direction, the base station communicates with the wireless station in a conflict-free, broadcast mode of operation using the downlink communication channel.

Figure 2:
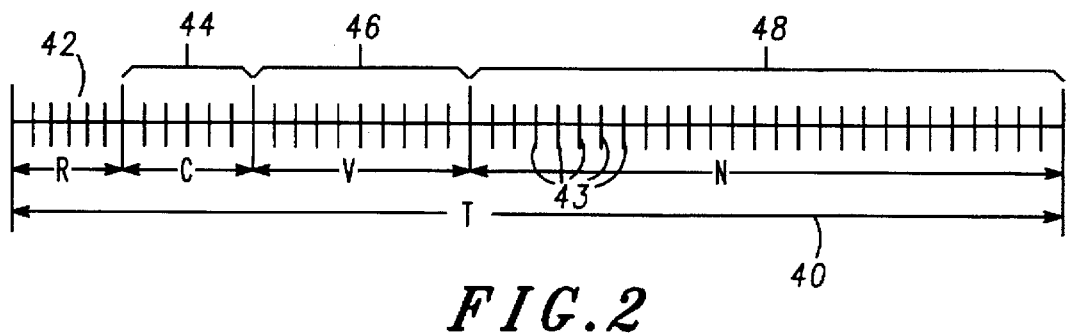
FIG. 2 is a diagrammatic illustration of a typical wireless frame in the wireless uplink of FIG. 1.

Referring to FIG. 2, channel time in such a TDMA based system is generally organized as a sequence of frames 40 having a time duration, T. Respective time slots in the frame 40 are indicated generally by time slot division lines 43. In a preferred embodiment, each slot is wide enough to contain an ATM cell (i.e., 53 bytes long) as well as additional link control information for reliable link level transmission. A first portion 42 of each frame (which may be called a subframe) is allocated for a random access mode of operation (denoted by "R"), which is information designed for transmission only at the beginning of a slot and transmitted at a random time. This subframe R is used for various types of control information, such as requests for slots in the other subframes, and may use a known protocol such as slotted-ALOHA or some variant thereof. The remainder of the frame 40 is then allocated for handling different types of traffic of the service classes described above. In the embodiment illustrated in FIG. 2, subframe 44 is allotted to constant bit rate service (denoted by "C"), subframe 46 is dedicated to variable bit rate-real time service (denoted by "V") and subframe 48 is allocated to non-real time service (denoted by "N") including VBR-NRT, UBR and ABR. The description of the invention hereinafter will focus primarily upon a method of bandwidth allocation for non-real time traffic, that is, within subframe 48.

Generally speaking, a scheduler (e.g., a microcomputer) running at the base station 14, 16 can perform bandwidth scheduling functions in accordance with the following scheme of allocation.

We first define the following variables. Let, $T(k)$=total number of slots in Frame k The total bandwidth, $T(k)$, is shared among the traffic classes, CBR, VBR-RT and the non-real time users. Of these, CBR and VBR-RT traffic amounts are bounded from above and thus constrained from dominating the use of shared bandwidth. These constraints are expressed by the variables, CBR_MAX and VBR_MAX, defined below. The applications using CBR and VBR-RT services will use bandwidth on a repetitive basis, and conceptually they place an implicit request for slots in a sequence of frames until the "call" is disconnected.

CBR_MAX=maximum number of slots that can be allocated to CBR traffic in a frame;

VBR_MAX=maximum number of slots that can be allocated to VBR-RT traffic in a frame.

According to the invention, the total bandwidth is divided into the following components (subframes). Let, $R(k)$=number of slots available in frame k for access in random access mode $C(k)$=total number of slots allocated in frame k to CBR traffic $V(k)$=total number of slots allocated in frame k to VBR-RT traffic $N(k)$=total number of slots available in frame k for sharing among non-real time traffic classes The actual amount of bandwidth allocated to CBR and VBR-RT users will depend on the actual demand present at that time.

The following relationships will be satisfied for each frame.

$T(k)=R(k)+C(k)+V(k)+N(k)$ $0<=C(k)<=CBR\_MAX$ $0<=V(k)<=VBR\_MAX$

Assuming there are m users $\{U1, U2, \ldots, Um\}$ in the non-real time user population, let the number of slots needed to fully satisfy user Ui at the beginning of Frame k be $d(i,k)$. Note that the actual allocation to Ui will depend on the availability of sufficient bandwidth. The user needs may be partially satisfied by allocating fewer than $d(i,k)$ slots in Frame k. Any unfulfilled demand will be satisfied in subsequent frames when sufficient bandwidth is available. Let the total demand from all non-real time users at the beginning of Frame k be denoted $D(k)$. We have, $D(k)=d(1,k)+d(2,k)+d(3,k)+\ldots+d(m,k)$ For $1<=i<=m$, compute the proportion $f(i,k)$ defined as follows.

$f(i,k)=d(i,k)/D(k)$

Let the number of slots allocated to User Ui in Frame k be denoted as $Alloc(i,k)$.

$Alloc(i,k)$=lesser of(integer part of $[f(i,k)*N(k)]$, $d(i,k)$)

Let the number of slots newly requested for non-real time traffic by User i in Frame k be denoted $dnew(i,k)$.

At the beginning of Frame (k+1), perform the following steps:

1) Compute the demands for each non-real time User i as;

$d(i,k+1)=d(i,k)-Alloc(i,k)+dnew(i,k)$

2) Determine the total number of slots, $N(k+1)$, available for sharing among the non-real time users;

$N(k+1)=T(k+1)-R(k+1)-C(k+1)-V(k+1)$.

The values of $C(k+1)$ and $V(k+1)$ depend on the status of CBR and VBR-RT type requests from Frame k (i.e., whether they are disconnected at the end of Frame k) and whether new requests of either type are accepted in Frame (k+1).

The non-real time users may belong to one of several, say P, priority classes. To illustrate, let there be three priority classes: HIGH, MEDIUM, and LOW. The above allocation process will satisfy the slot requests of users in the HIGH priority class. If there are multiple users in this class, the allocation process described above will be used to assign slots in proportion to the demands of the HIGH priority users. After all demand of HIGH priority class is satisfied, the allocation process will be applied to satisfy the demands of the MEDIUM priority class. After all demand of the MEDIUM priority class is satisfied, the fair allocation process will be applied to satisfy the demands of the LOW priority class. One of ordinary skill in the art will appreciated that the generalization to an arbitrary number of priority classes is straightforward.

Figure 3:
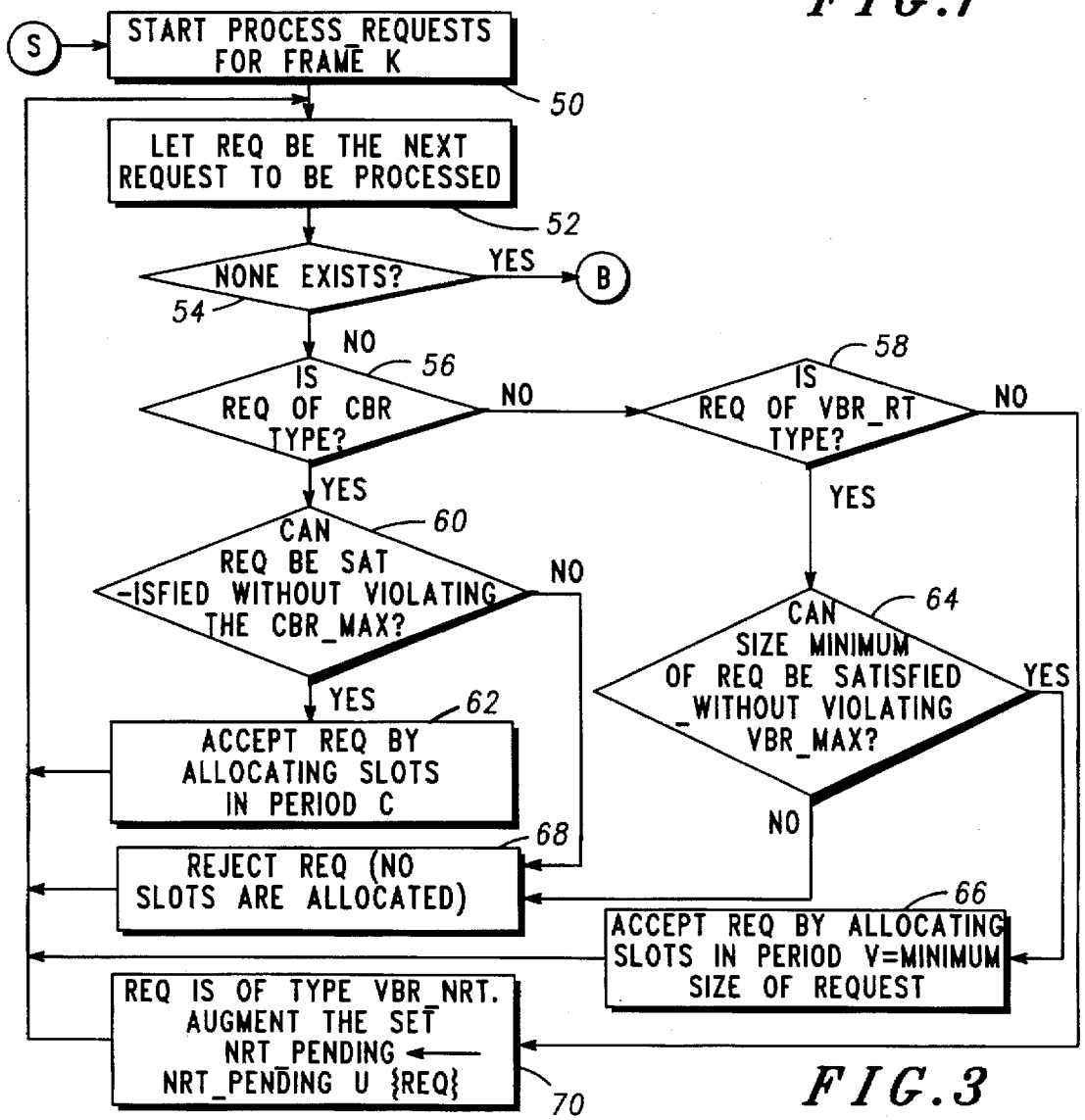
FIGS. 3 and 4 are flow charts illustrating a method of bandwidth allocation in accordance with the invention.
Figure 4:
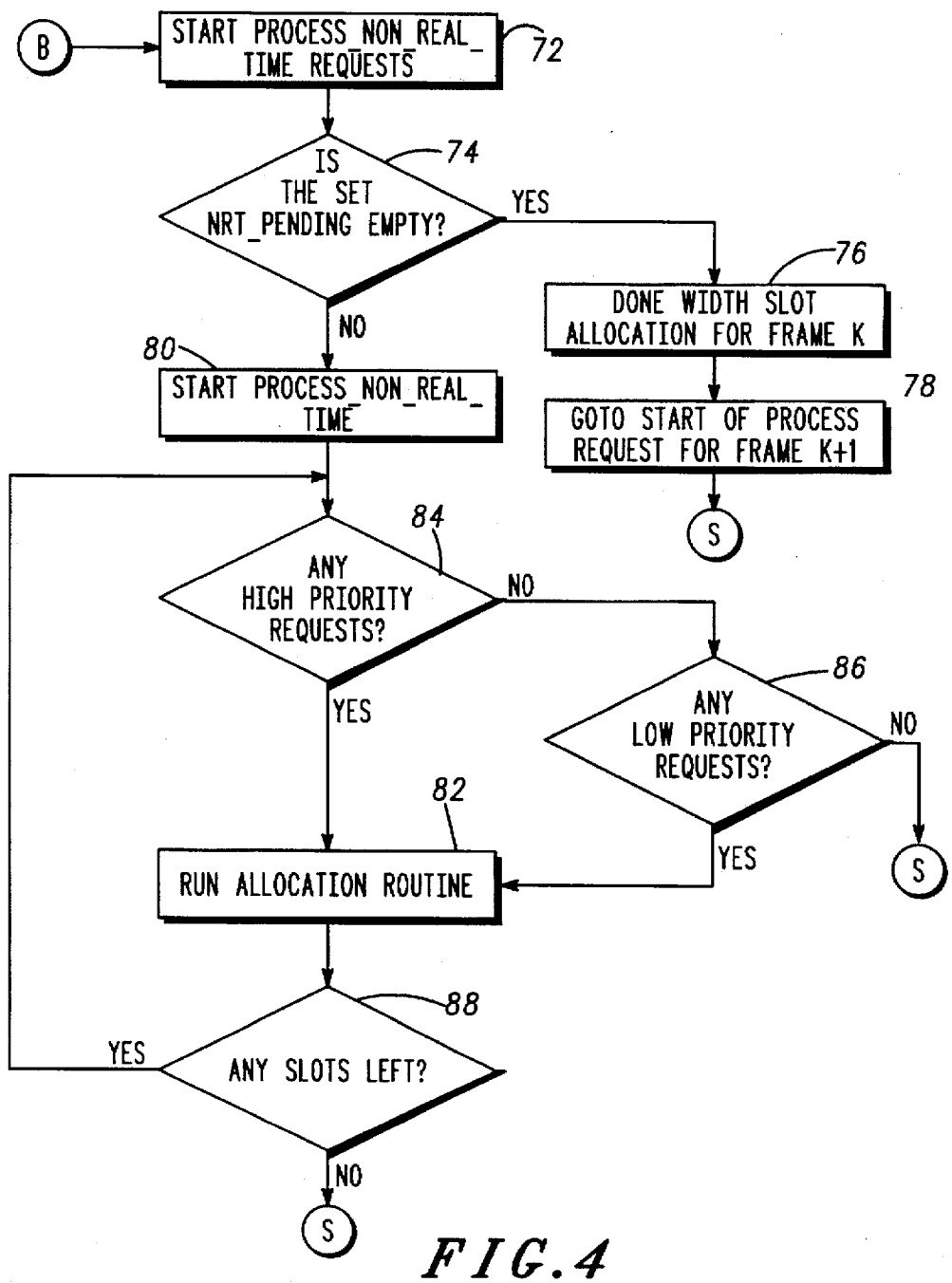

FIGS. 3 and 4 illustrate an exemplary flowchart for carrying out allocation, in accordance with the invention. The start of the process for any particular frame K, such as frame 40 of length T, is indicated generally at reference numeral 50. For a given frame that is designated K, the previous frame would be K−1 and the following frame would be K+1. The next request to be processed is handled firstly by determining whether a request exists, as indicated at reference numerals 52 and 54. Next, the type of the request is determined at reference numerals 56 and 58, that is, whether it is of the service classes CBR or VBR-RT as defined above.

If a CBR service class request can be accommodated without violating (i.e., exceeding) the maximum number of slots that can be allocated to CBR traffic in a frame, it is allocated slots in subframe 44 (i.e., period "C") of FIG. 2, as indicated at reference numerals 60 and 62 of FIG. 3. Similarly, if a VBR-RT request has a minimum size that can be satisfied within the maximum number of slots that can be allocated to VBR-RT traffic, it is allocated slots in subframe 46 (i.e., period "V") of FIG. 2, as indicated at reference numerals 64 and 66 of FIG. 3. If either a CBR or VBR-RT request exceeds the maximum number of slots available for allocation in a frame, the request is rejected and no slots are allocated in that frame, as indicated at reference numeral 68.

Finally, if the request is of the type falling into the VBR-NRT (or other non-real time, such as UBR or ABR) service classes, it is placed into a set of pending requests of this type, as indicated at reference numeral 70 of FIG. 3, to be satisfied after the other classes of requests have been allocated slots in subframes 44 and 46 of a frame 40, as illustrated in FIG. 2.

Referring now to FIG. 4, the start of processing of non-real time requests beginning at point B is indicated at reference numeral 72. If the set NRT pending is empty at this point, the slot allocation is completed for Frame K and the process can return to the beginning at entry point S of FIG. 3 for the next frame K+1, as indicated generally at reference numerals 74, 76 and 78. If the set NRT pending is not empty, a non-real time allocation process can be started, as indicated at reference numeral 80. The allocation process or routine described hereinabove is indicated in FIG. 4 at reference numeral 82. In accordance with a further embodiment of the invention illustrated in FIG. 4, the request may be further broken down into one or more priority classes, here illustrated as high priority requests 84 and low priority requests 86, with the high priority requests being first allocated slots by allocation routine 82. Low priority requests are then allocated slots in accordance with the allocation routine 82 for so long as available slots remain in the subframe of Frame K allotted to non-real time requests, e.g., subframe 48 of the frame 40 of FIG. 2. When all of these slots have been allocated, the process returns to the beginning of the process S at reference numeral 50 of FIG. 3, for the following frame K+1, as indicated at reference numeral 88 of FIG. 4.

Accordingly, the process or method in accordance with the invention allocates shared bandwidth among a defined group of users, such as the VBR-NRT and other non-real time users (UBR and ABR). As illustrated in FIG. 2, the information in the system is communicated in a sequentially repeating series of frames of information, each frame being subdivided into a number of slots, and each slot being capable of carrying a quantity of information. The process or method of the invention then proceeds by initially determining the total number of slots available in a frame that are available for this defined group of users, for example, the slots of subframe N (i.e., 48) in the example of FIG. 2, which are available for the non-real time users (VBR-NRT, ABR or UBR). Thereupon, the number of slots requested by all of the users of this defined group (e.g., non-real time users) is determined, and an allocation routine or procedure is utilized to allocate a number of slots in the subframe to each user of the defined group in accordance with a predetermined allocation scheme.

Preferably, this predetermined allocation scheme proceeds by first determining a total request (D(k) as described above), which is equal to the sum of the number of slots requested by all of the users of the defined group, then computing the proportion (f(i,k) as described above) of the number of slots requested by each user to this total request; that is, a proportion equal to the number of slots requested by each user divided by the total request. Finally, a number of slots is assigned to each user of the defined group which is equal to the integer part of the product of this proportion and the total number of slots available for use by the defined group (Alloc(i,k) as described above), but not exceeding the amount requested, d(i,k). Any remaining slots that are unassigned after the above process are preferably distributed equally among the users whose allocations fell short of their demands (i.e., Alloc(i,k)<d(i,k)).

At the beginning of each frame, the number of slots requested by each user, indicated above by d(i,k+1), is determined by subtracting the number of slots allocated to this user in the immediately preceding frame, Alloc(i,k), from the number of slots requested by the user in the immediately preceding frame, d(i,k), and then adding thereto the number of slots requested by this user following the allocation of slots in the immediately preceding frame (dnew(i,k)).

As indicated above, the defined group of users may be divided into one or more priority classes, with the allocation of slots being separately performed for each priority class. For example, the allocating of slots would first be performed for a first or highest priority class, whereupon, a determination is made as to whether any slots available for the defined group remain (per test 88 of FIG. 4). If further available slots remain, the allocating step or process is, in a preferred embodiment, repeated for the next highest or second priority class, and so forth, through however many priority classes have been established.

One scheme for assigning priority classes in accordance with the invention is based upon determining whether the number of slots allocated to a given user or group of users in each frame is less than the number of slots requested by that user or those users in that frame. Thus, a first priority class would consist of users for whom the number of slots requested exceeds the number of slots allocated in the immediately preceding frame. This priority class would be considered a higher priority than other users whose requests had been fully met by the allocation in the immediately preceding frame, or whose requests are new in the current frame.

Yet further classes of priority might be assigned in accordance with the number of preceding frames in which a request for a given user or group of users exceeds the number of slots which were allocated in each frame. In other words, the priority classes would be assigned, and allocation would take place in generally the inverse order of the cumulative number of frames during which each user or group of users had made requests that exceeded the number of slots allocated to those users. That is, the users whose request had exceeded the allocation for the greatest number of preceding frames would be assigned the highest priority for allocation in the current frame.

Thus, in the above-described scheme of priority, the highest priority is assigned to those users whose request has exceeded the number of slots allocated in the greatest number of consecutive frames immediately preceding the current frame. For example, a user whose request has exceeded the allocated number of frames for three consecutive frames immediately preceding the current frame will be assigned priority ahead of a user whose request has exceeded the allocated number of slots for two consecutive frames immediately preceding the current frame.

What has been set forth hereinabove is a flexible and efficient method for allocating wireless bandwidth to a mix of heterogeneous wireless users requiring different types and amounts of data rate services. These users share a broadcast medium that can be based on radio, cable, infrared or other wireless resources. The invention presents methods that enable these users to have fairly allocated access to the shared medium.

What is claimed is:

1. A method for allocating shared bandwidth among a defined group of users of a communications system in which information is communicated in a sequentially repeating series of frames of information, each of the sequentially repeating series of frames being subdivided into a plurality of slots, each of the plurality of slots being capable of carrying a quantity of information, said method comprising the steps of:

determining a number of slots in a frame available for said defined group of users;

determining a number of slots requested by at least one user of said defined group of users; and allocating a number of slots in said frame to the at least one user in accordance with a predetermined allocation scheme, wherein the step of allocating comprises the steps of:

determining a total request value equal to a sum of the number of slots requested by the at least one user;

computing a proportion equal to the number of slots requested by the at least one user divided by the total request value; and assigning a number of slots to each of the at least one user equal to an integer part of a product of said proportion and the number of slots in said frame available for use by said defined group of users.

2. The method according to claim 1, wherein the step of determining the number of slots requested by at least one user further comprises the step of subtracting a number of slots allocated to a first user in an immediately preceding frame from a number of slots requested by the first user in the immediately preceding frame and adding thereto a number of slots requested by the first user following the allocation of slots in the immediately preceding frame.

3. The method according to claim 1, further comprising the steps of:

dividing users in said defined group of users to at least two priority classes, including a first priority class and a second priority class;

performing said allocating step for each of said users in said first priority class for so long as any of said slots in said frame available for said defined group of users remain unallocated;

determining whether any of said slots available for said defined group of users remain unallocated in a frame following the performing of said allocating step for each of said users in said first priority class; and repeating said allocating step and said determining step for users in said second priority class if available slots remain in said frame following performing of said allocating step for all of said users in said first priority class.

4. The method according to claim 1, further comprising the steps of:

dividing users in said defined group to at least two priority classes, including a first priority class consisting of users for whom a number of slots requested exceeds a number of slots allocated in an immediately preceding frame and a second priority class comprising other users of said defined group of users;

performing said allocating step for each of said users of said first priority class for so long as any of said slots in said frame available for said defined group of users remain unallocated;

determining whether any of said slots in a frame available for said defined group of users remain unallocated following said performing of said allocating step for each of said users of said first priority class; and repeating said allocating step and said determining step for said users of said second priority class if available slots remain in said frame following performing of said allocating step for all of said users of said first priority class.

5. The method according to claim 4, wherein said dividing step further includes the steps of:

establishing, in said first priority class, a plurality of additional priority subclasses, each priority subclass corresponding to a different cumulative number of sequential frames immediately preceding a current frame during which the number of slots requested by users of that subclass exceeds the number of slots allocated to said users of that subclass; and performing the allocating step and the determining step for each of the users of each of said subclasses, taking respective subclasses in an order that is inverted with respect to the corresponding cumulative number of sequential frames immediately preceding a current frame during which the number of slots requested by the users of that subclass exceeds the number of slots allocated to said users of that subclass.

6. The method according to claim 4 wherein the dividing step further includes the step of:

establishing a plurality of additional priority subclasses in said first priority class, each priority subclass corresponding to a different cumulative number of sequential frames immediately preceding a current frame during which the number of slots requested by the users of that subclass exceeds the number of slots allocated to the users of that subclass; and performing the allocating step and the determining step for each of the users of a subclass having a higher cumulative number of sequential frames immediately preceding a current frame during which the number of slots requested exceeds the number of slots allocated and determining whether any of the slots in a frame available for said predetermined group of users remain following each performing of said allocating step, and repeating the allocating step and the determining step for remaining users of said priority subclasses, taking respective subclasses in the inverse order of the corresponding cumulative number of frames during which the number of slots requested by the users exceeds the number of slots allocated to the users, for so long as available slots remain in the frame following each allocating step and each determining step.

7. A method for allocating shared bandwidth among a defined group of users of a communications system in which information is communicated in a sequentially repeating series of frames of information, each of the sequentially repeating series of frames being subdivided into a plurality of slots, each of the plurality of slots being capable of carrying a quantity of information, said method comprising the steps of:

determining a total request value equal to a sum of a number of slots requested by all users of said defined group of users;

computing a proportion equal to the number of slots requested by all users of said defined group of users divided by the total request value; and assigning a number of slots in a frame to each user of said defined group of users equal to an integer part of a product of said proportion and a total number of slots in said frame available for use by said defined group of users.

8. The method according to claim 7, further comprising the step of:

determining the number of slots requested by each user by subtracting a number of slots allocated to a first user in an immediately preceding frame from a number of slots requested by the first user in the immediately preceding frame and adding thereto a number of slots requested by the first user following the allocation of slots in the immediately preceding frame.

9. The method according to claim 7, further comprising the steps of:

dividing users in said predetermined group to at least two priority classes, including a first priority class and a second priority class;

performing said assigning step for each of said users in said first priority class for so long as any of said slots in said frame available for said defined group of users remain unallocated; and repeating said assigning step for users in said second priority class if available slots remain in said frame following performing of said assigning step for all of said users in said first priority class.

10. A base station that facilitates communications between a plurality of wireless stations and an asynchronous transfer mode (ATM) switch for routing information therethrough using a communications link, the base station comprising:

a wireless communications link interface, that operably couples the plurality of wireless stations to the base station; and processor means, operably coupled to the wireless communications link, for allocating bandwidth among the plurality of wireless stations, the processor means employing the steps of:

determining a number of slots in a frame available for a defined group of wireless stations within the plurality of wireless stations;

determining a number of slots requested by at least one wireless station of said defined group of wireless stations; and allocating a number of slots in said frame to the at least one station in accordance with a predetermined allocation scheme, wherein the step of allocating the number of slots in said frame to the at least one station comprises the steps of:

determining a total request value equal to a sum of the number of slots requested by the at least one user;

computing a proportion equal to the number of slots requested by the at least one user divided by the total request value; and assigning a number of slots to each of the at least one user equal to an integer part of a product of said proportion and the number of slots in said frame available for use by said defined group of users.

\* \* \* \* \*